United States Patent [19]

Tokura et al.

[11] Patent Number: 5,787,497
[45] Date of Patent: Jul. 28, 1998

[54] DIRECT MEMORY ACCESS CONTROL DEVICE FOR A RING BUFFER

[75] Inventors: Hitoshi Tokura; Jun Yamashita, both of Saitama, Japan

[73] Assignee: Fuji Xerox Co., Ltd., Tokyo, Japan

[21] Appl. No.: 863,291

[22] Filed: May 27, 1997

Related U.S. Application Data

[63] Continuation of Ser. No. 77,636, Jun. 17, 1993, abandoned.

[30] Foreign Application Priority Data

Jun. 18, 1992 [JP] Japan ................ 4-184539

[51] Int. Cl.$^6$ ..................................................... G06F 13/28
[52] U.S. Cl. ........................................... 711/220; 395/846
[58] Field of Search ................................ 395/846, 872; 711/219, 220

[56] References Cited

U.S. PATENT DOCUMENTS 4,800,524 1/1989 Roesgen ............................. 711/217
5,333,290 7/1994 Kato .................................. 395/846
5,463,749 10/1995 Wertheizer et al. ................. 711/110
5,471,600 11/1995 Nakamoto ............................ 711/5

*Primary Examiner*—Jack A. Lane
*Attorney, Agent, or Firm*—Finnegan, Henderson, Farabow, Garrett & Dunner, L.L.P.

[57] ABSTRACT

A DMA control device for generating an address value to a ring buffer according to the present invention is provided with an address generation circuit for generating address signals to the ring buffer sequentially by providing an initial value with an address value within a range where the ring buffer is set, and a corrected address generation circuit for initializing the address generation circuit by use of a value obtained by subtracting the total number of addresses of the ring buffer from an address value of the address signals generated from the address generation circuit when the address value of the address signals exceeds a final address of the ring buffer.

8 Claims, 5 Drawing Sheets

DIRECT MEMORY ACCESS CONTROL DEVICE FOR A RING BUFFER

This application is a continuation of application Ser. No. 08/077,636, filed Jun. 17, 1993, now abandoned.

BACKGROUND OF THE INVENTION

The present invention relates to a DMA control device which transfers data between a memory and its peripheral device according to a DMA (Direct Memory Access) method.

The DMA method is often employed to transfer data between a memory and a peripheral device not through a CPU (Central Processing Unit), for example, with an image processing system.

FIG. 4 is a block diagram of the general structure of an image processing system. As shown in FIG. 4, the image processing system is provided with an image memory 21, a system bus 22, an image bus 23, a bus connector 24, an image input part 30, DMACs (DMA control devices) 31 and 41, an image output part 40, and a CPU 50, respectively.

Image data are input from the image input part 30 and are transferred to the image memory 21 by the DMAC 31. From the image memory 21, the data are transferred by the DMAC 41 to the image output part 40, and are then output to an image recording part (not shown).

FIG. 5 is a view explaining a conventional example of operations to input and output image data to and from the image memory. The horizontal length of FIG. 5 shows time: That is, (a) is time which is taken to input the image; and, (b) is time which is taken to output the image. Numerals (1), (2), and the like are numbers which are given in order to distinguish the input and output image data from one another, respectively.

In input and output operations of the image data, input and output are executed simultaneously with each other. However, in general, in the case of the same image, a required time for the image output is shorter than that for the image input. For this reason, in order that the image output may not catch up with the image input in the conventional example, the image output is started after the image input is completed by a page. At the same time, the image input of the next page is started. That is, at first, after the image data (1) of the 1st page are input to the image memory 21, the image data (2) of the 2nd page are input to the image memory 21 while the image data (1) are transferred to the image output part 40. Similarly to the above, the following image data (3) and (4) are input and output successively.

On the other hand, conventionally, a ring buffer is used as a buffer memory for DMA data transfer.

Now, FIG. 6 is a view explaining an operation of the ring buffer. In FIG. 6, $A_s$ designates the start address of the ring buffer, $A_E$ stands for the final address of the ring buffer, and $A_1$, $A_2$ and $A_3$ point out the addresses of the boundaries of the respective pages of the image data written in the ring buffer, respectively. Also, a pointer WR designates a position where the data are currently written into the ring buffer, and a pointer RD stands for a position where the data are currently read out from the ring buffer. The address value of the ring buffer increases as it shifts downwardly in FIG. 6, and the positions designated by the pointers WR, RD shift downwardly as the time proceeds.

It is assumed that the data are written sequentially from the top of FIG. 6. In this case, the written data reach the final address $A_E$ of the ring buffer while the n-th data are written after the (n−1)th data. The address is returned to the start address $A_S$ of the ring buffer and the next data are written again with the start address. FIG. 6 illustrates a state in which writing of the n-th page is completed and writing of the (n+1)th page is currently executed at the position shown by the pointer WR.

If it returns to the start address $A_S$ for continuous writing in this manner at each time when the data writing reaches the final address $A_E$, then the data that have been written previously in the vicinity of the start address $A_S$ is erased when new data are written. Therefore, the data that have already been written must be read out before the writing position goes back to the address again and new data are written in the same address. For this purpose, in the example shown in FIG. 6, the data are read out at the position shown by the pointer RD so that it can follow the movement of the data writing position shown by the pointer WR.

This manner makes it possible to carry out the writing and reading of the data without hindrance and also the memory area to be used can be reduced in size in comparison with a method where a ring structure is not employed.

However, with the above-mentioned conventional system, there is a problem that, when the data written in the ring buffer are read out in a skipping manner, the data reading position is shifted when the reading address returns back to the start address of the ring buffer, which makes it impossible to read out the correct data.

FIG. 7 shows a view explaining a case in which a part of the image data are read out in the image memory. It is assumed that data A are already written in the image memory and a part B of the data A are to be read out. The part B include L words per line and a part C include the remaining M words per line which are unnecessary data.

While reading out the data of the part B, L words are read out and then M words are skipped, after which the reading proceeds to the next line, where, similarly, L words are read out and M words are skipped; that is, it is necessary to access the data in the memory while skipping in part. In case that the memory is constructed with a ring buffer, operation can be described as follows.

FIG. 8 shows a view explaining an operation of the ring buffer when the part of the image data are read out in the image memory. In FIG. 8, reference characters respectively correspond to those shown in FIG. 6, and $A_T$ designates the start address of the data to be read out. $L_1$, $L_2$ and $L_3$ stand for data corresponding to one line in the part B in FIG. 7, respectively. $M_2$ and $M_3$ point out data corresponding to one line in the part C in FIG. 7, respectively. $M_1$ and $M_4$ designate the data corresponding to one line in the part C in FIG. 7 that are divided into the final and start parts of the ring buffer, respectively.

In the ring buffer, there are sequentially written the data of the respective line, for example, with one line being composed of the L words of the data $L_1$ and the M words of the data $M_2$. In reading out such data, the L words of the data $L_1$ are read out and then the M words of the data $M_2$ are skipped, and after then the L words of the next data $L_2$ are read out; such reading and skipping are executed repeatedly.

There arises a problem when the written data reach the final address $A_E$ of th ring buffer in the middle of the M words to be skipped. For example, the data $M_4$ and $M_1$ shown in FIG. 8 are in a condition that the written data reach the final address $A_E$ at a time when the data to be skipped are written only by (m−α) words after the L words of the data to be read out are written. In the condition, the remaining a words of the data to be skipped are sequentially written at the addresses of the ring buffer beginning at the start address $A_S$ thereof. After then, the data $L_1$ to be read out are written by the L words thereof.

From a view of the start address $A_S$ of the ring buffer, the starting address $A_T$ of the first data to be read out is expressed as a start address of read-out target data.

In the case of reading out only the read-out target data of the data written in the above-mentioned manner, after the L words of the read-out target data $L_3$ just previous to the final address are read out, the written data shift over the final address $A_E$ while the data $M_4$ are skipped. In this case, the next read-out should be returned back to the start part of the ring buffer and should be started at the start address $A_T$ of the read-out target data. However, with the conventional ring buffer read-out system, the read-out begins at the start address $A_S$ of the ring buffer. Therefore, the data $M_1$ to be skipped, which are written in a part of α words from the start address $A_S$ of the ring buffer, are read out. As a result, it is impossible to read out the data with accuracy.

SUMMARY OF THE INVENTION

The present invention aims at eliminating the drawbacks found in the above-mentioned conventional system. Accordingly, it is an object of the invention to provide an improved DMA control device which can read out data with accuracy.

In attaining the above object, according to the present invention, there is provided a DMA control device capable of generating address values for a ring buffer, the control device provides an address generation circuit which generates the address signals to the ring buffer sequentially by providing an initial value with an address value in the range where the ring buffer is set, and a corrected address generation circuit which initializes the address generation circuit by use of an address value obtained by subtracting the total number of addresses of the ring buffer from the address value when the address value from the address generation circuit exceeds the final address of the ring buffer.

Also, the address generation circuit includes a circuit which outputs an address value while shifting by a predetermined address at a constant cycle.

Further, the address generation circuit includes a counter which increases address values sequentially, and which is cleared and generates a line feed signal when the address value reaches a set value, and a circuit which generates the start address value of the next line each time that the line feed signal is generated, and which adds the start address value to the value of the counter.

On the other hand, the corrected address generation circuit includes a first register for holding the final address of the ring buffer, a second register for holding the start address of the ring buffer, a subtractor for outputting a difference between the value of the first register and the value of the second register, and a circuit for outputting a value obtained by subtracting the output of the subtractor from the output of the address generation circuit.

According to the present invention, when the address value from the address generation circuit exceeds the value of the final address of the ring buffer, the address generation circuit is initialized by use of an address value obtained by subtracting the total number of addresses of the ring buffer from the address value. As a result, in the case of reading out the data written in the ring buffer, even if an address value from the address generation circuit is output so as to shift over the final address of the ring buffer, the read-out position can return to the start address of the read-out target data. Therefore, it is possible to read out the data with accuracy.

DETAILED DESCRIPTION OF THE PREFERRED EMBODIMENTS

Description will be given below in detail of embodiments of a DMA control device according to the present invention with reference to the accompanying drawings.

Figure 1:
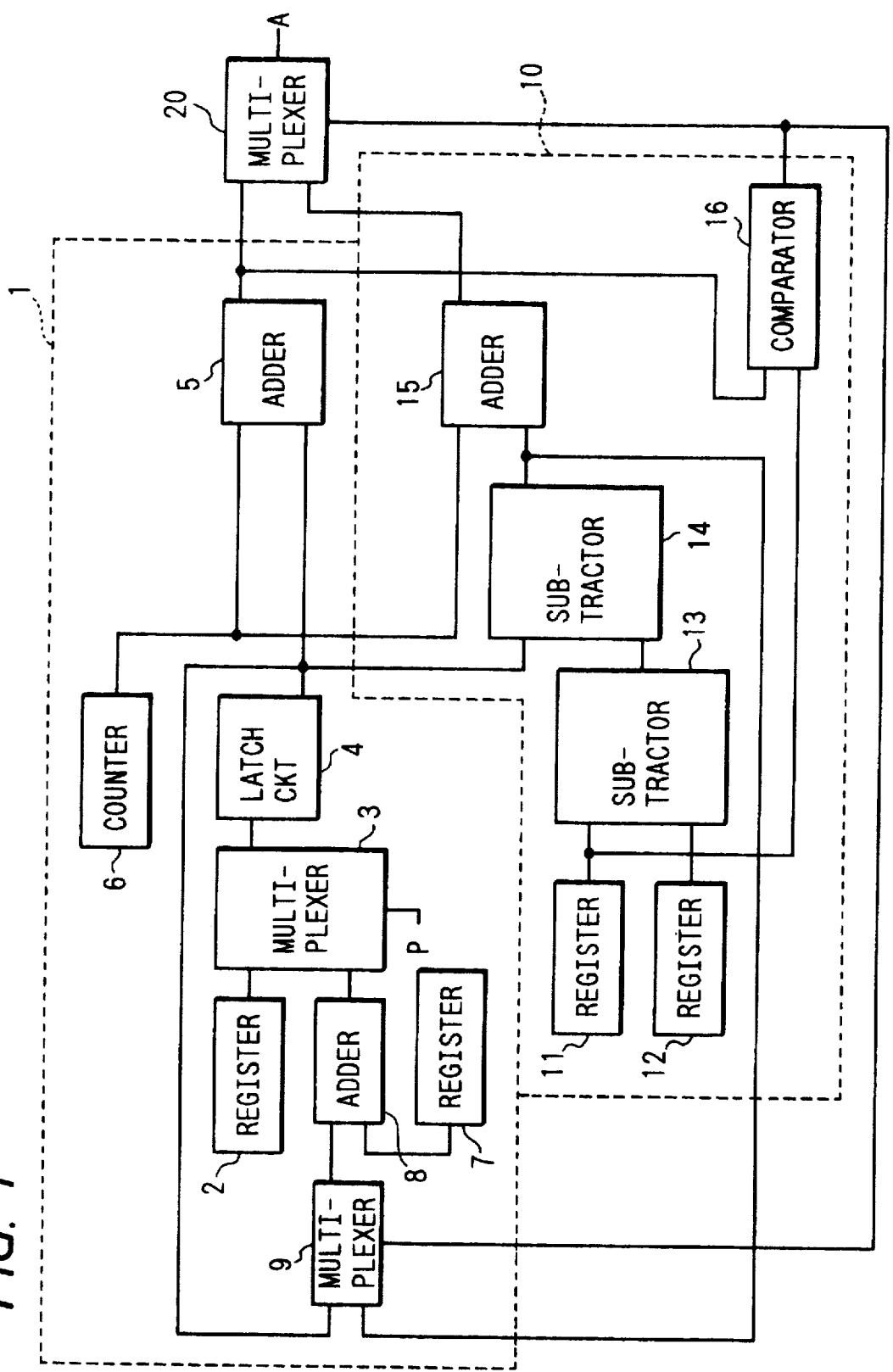
FIG. 1 is a block diagram showing a first embodiment of a DMA control device according to the present invention.

FIG. 1 is a block diagram of a first embodiment according to the present invention. In FIG. 1, reference character 1 designates an address generation circuit. The address generation circuit 1 is provided with registers 2 and 7, multiplexers 3 and 9, a latch circuit 4, adders 5 and 8, and a counter 6. Reference character 10 designates a corrected address generation circuit. The corrected address generation circuit 10 is provided with registers 11 and 12, adders 15, and a comparator 16 and feeds its output to multiplexer 20.

The address generation circuit 1 is of a type in which an initial value is provided with an address value of a part where the starting part of data are written, and the address value is sequentially increased to thereby generate address signals to a ring buffer. The corrected address generation circuit 10 is of a type in which a corrected address value is output in order to always access a start address of read-out target data when the address value from the address generation circuit is output so as to shift over the final address of the ring buffer. The output of the address generation circuit 1 and the output of the corrected address generation circuit 10 are selectively switched by the multiplexer 20 before one of them is output to a terminal A.

Figure 7:
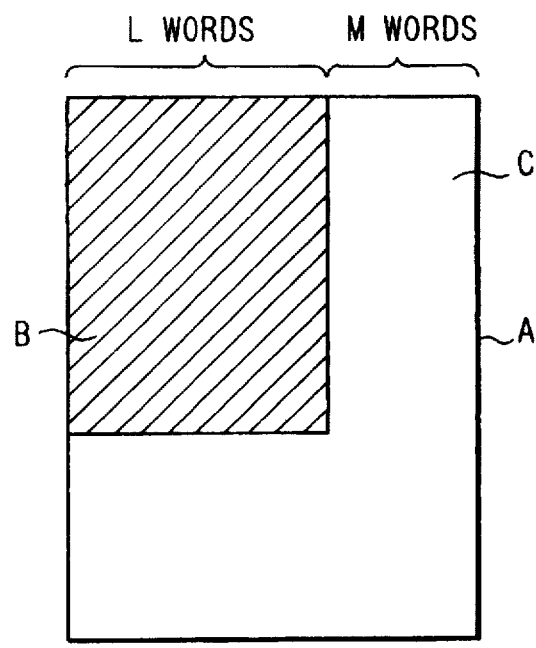
FIG. 7 is a view explaining an operation to be performed when a part of image data in an image memory are read out; and, FIG. 8 is a view explaining an operation to be performed by a ring buffer when a part of image data in an image memory are read out.
Figure 8:
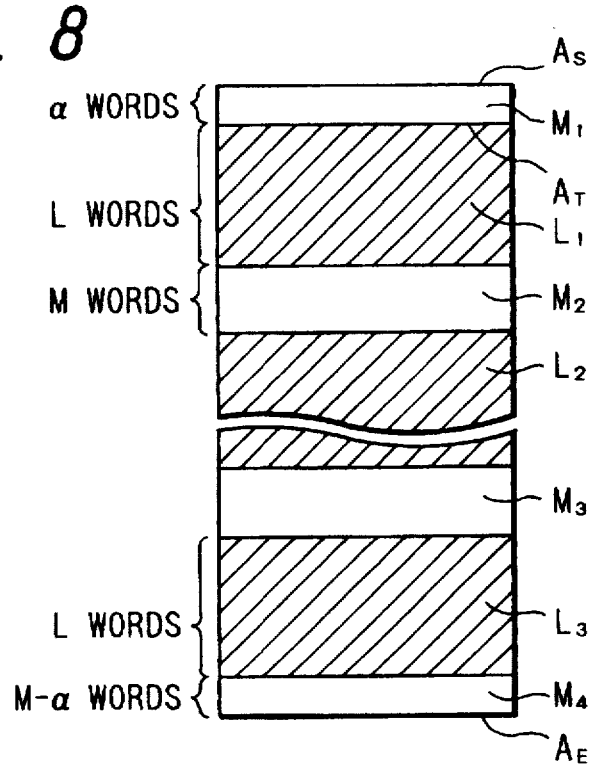

The following describes an operation of a circuit shown in FIG. 1, referring to a case in which data shown in FIGS. 7 and 8 are transferred from the ring buffer to an image recording part.

First, internal operations of the address generation circuit will be described.

Before starting the DMA transfer, a DMA transfer start address value (an address value existing in a part where the first data of the first line of the first page are written) is previously input in a register 2, a difference between the values of the start addresses of two succeeding lines (which corresponds to L+M as shown in FIG. 8) is input in a register 7, and these values are held therein, respectively.

The multiplexer 3 receives a switch signal from a terminal P at the start of a page and gives the output of the register 2 to the latch circuit 4. Since the DMA transfer start address value is held in the register 2, the start address value of a line where the DMA transfer starts is latched in the latch circuit 4. The adder 5 adds the output of the latch circuit 4 to the count value of the counter 6. Since the counter 6 counts up each time one word transfer is completed, the output of the adder 5 is sequentially provided with the addresses of the line. When the counter 6 counts L words, then a line feed signal is output. At the same time, the counter 6 is cleared and the value of the latch circuit 4 is also updated, so that the following M words are skipped.

Since the multiplexer 3 is switched to the adder 8 side in other parts of a page except the start part thereof, the updated value of the latch circuit 4 becomes a value obtained by adding the value of the latch circuit 4, which is prior by a line through the multiplexer 9, to the value of the register 7. Since there is held the difference between the two succeeding lines addresses in the register 7, the output of the adder 8 provides the start address value of the next line. In the latch circuit 4, therefore, there are sequentially latched the start addresses of the next lines.

In this manner, when the counter 6 counts the data transfer corresponding to the L words, then a line feed signal is output. Simultaneously the counter 6 is cleared and also, in the latch circuit 4, there is latched the start address value of the next line which is output from the multiplexer 3. In the adder 5, the output of the latch circuit 4 is added to the count value of the counter 6 to thereby generate an address signal. As a result, an address signal is output from the address generation circuit 1, in each of the lines so that the next M words are skipped when L words are read out.

Next, it will describe an operation of the corrected address generation circuit 10.

In the registers 11, 12 of the corrected address generation circuit 10, respectively, there are set the value of the final address (the final address $A_E$ shown in FIG. 8) in area to be used as a ring buffer within a memory and the value of the start address (the start address $A_S$ shown in FIG. 8). A subtractor 13 calculates a difference between the final and start addresses of the ring buffer set in the registers 11 and 12, respectively. The resultant value is nothing but the total number of the addresses in the area used as a ring buffer.

A subtrator 14 subtracts the output of the subtractor 13 from the output of the latch circuit 4, that is, from the start address of a line which is currently transferred. Further, the adder 15 adds the count value of the counter 6 to the value subtracted by the subtractor 14. The output of the adder 15 provides the value of the start address $A_T$ (see FIG. 8) of the read-out target data when the transfer address shifts over the final address of the ring buffer and returns back to the start part of the ring buffer.

On the other hand, the comparator 16 compares the address value output from the adder 5 with the final address of the ring buffer set in the register 11. When the address value shifts over the final address of the ring buffer, then the comparator 16 outputs a switching signal to the multiplexers 9 and 20. On receipt of the switching signal, the multiplexer 20 outputs the output from the adder 15 to the terminal A instead of the output from the adder 5.

Also, on receipt of the switching signal, the multiplexer 9 applies the output from the subtractor 14 to the adder 8 instead of the output from the latch circuit 4. The adder 8 adds together the value of the subtractor 14 and the value of the register 7, that is, a difference between the respective start addresses of the 2 succeeding lines, and then outputs the sum to the latch circuit 4 through the multiplexer 3.

Description will be further given of a relation between the output values of the respective components of the above embodiment.

Figure 3:
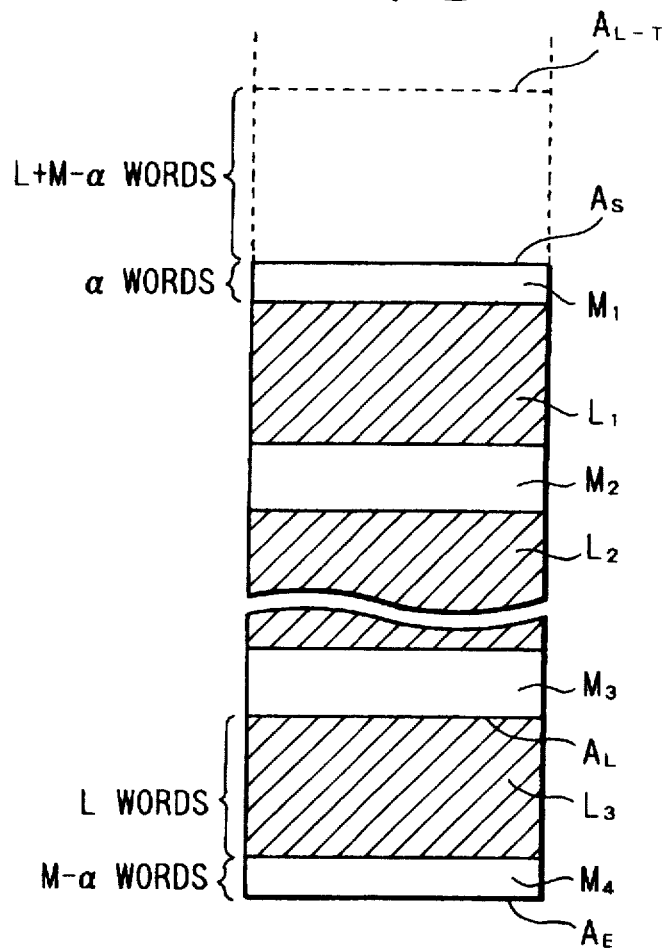
FIG. 3 is a view explaining an operation of a DMA control device according to the present invention.
Figure 4:
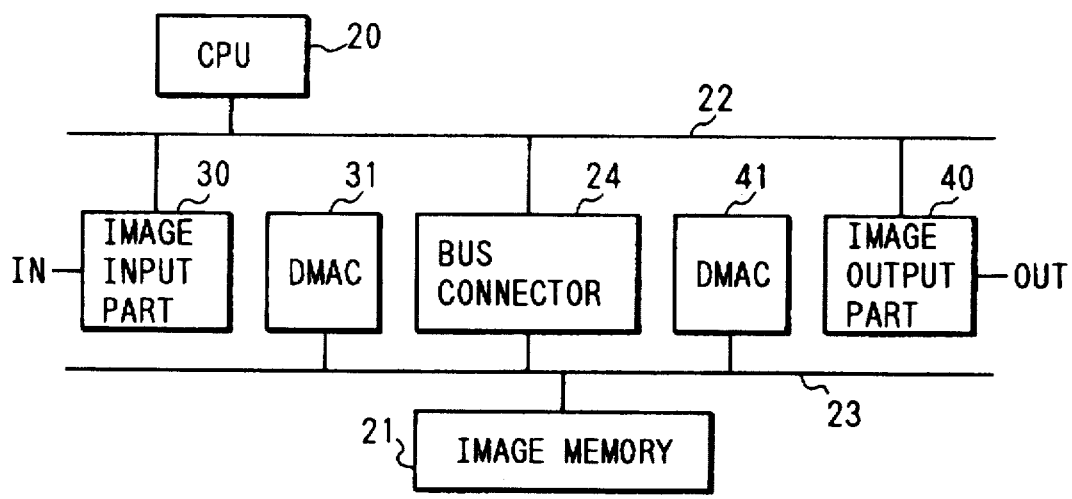
FIG. 4 is a block diagram showing the outline of an image processing device.
Figure 5:
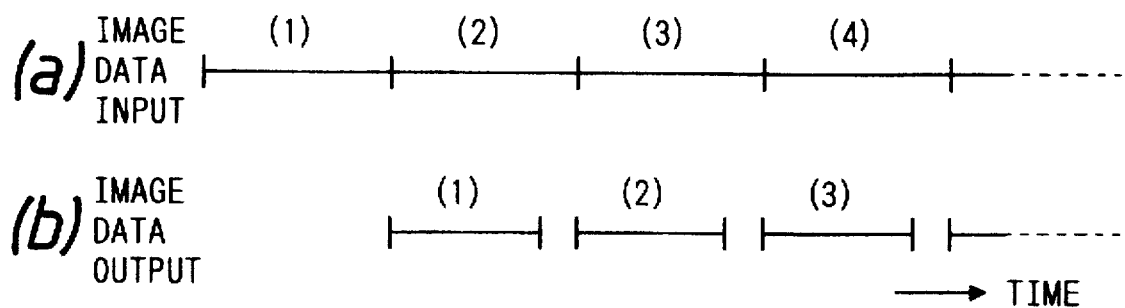
FIG. 5 is a view explaining an example of input/output operations of image data into and from an image memory.
Figure 6:
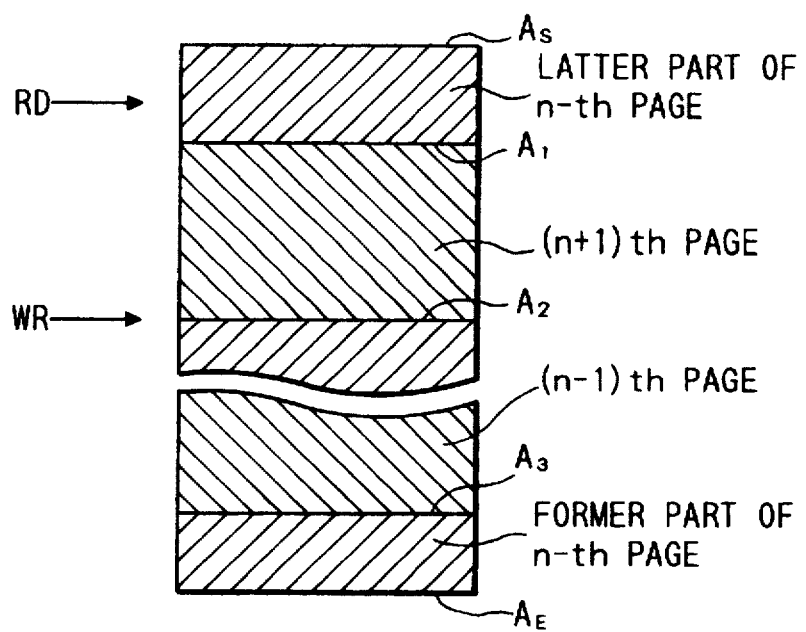
FIG. 6 is a view explaining an operation of a ring buffer.

FIG. 3 is a view explaining an operation of the DMA control device according to the present invention. In FIG. 3, reference characters respectively correspond to those shown in FIG. 8 and $A_L$ designates the start address of a line written just before the final address $A_E$ of the ring buffer. It is assumed that the address $A_L$ is currently read out. $A_{L-T}$ stands for an address which corresponds to a value obtained by subtracting the total number of the addresses in an area used as a ring buffer from the value of the currently read-out address $A_L$, and the address $A_{L-T}$ is situated out of the ring buffer area. In FIG. 3, such ring buffer out-of-area parts are imaginarily shown by dotted lines.

If there is found a difference between the start address $A_S$ of the ring buffer and the address $A_{L-T}$, then the resultant difference coincides with a difference $A_E-A_L$ between the final address $A_E$ of the ring buffer and the address $A_L$. This can be shown by use of an equation as follows:

That is, if the total number of the addresses in the area used as a ring buffer is expressed as T, then the following equation is obtained:

$$A_S - A_{L-T} = A_S - (A_L - T)$$
$$= A_S - \{A_L - (A_E - A_S)\}$$
$$= A_E - A_L$$

The number of addresses between $A_E$ and $A_L$ is L+M-α. Therefore, the number of addresses between $A_S$ and $A_{L-T}$ is also L+M-α.

At present, since the address $A_L$ is read out, from the latch circuit 4, there is output the value of the address $A_L$ that is the value of the start address of a line transferred at that time. At that time, from the subtractor 14, there is output a value obtained by subtracting the total number of addresses in the area used as a ring buffer from the value of the address $A_L$, that is, the value of the address $A_{L-T}$ out of the area of the ring buffer.

After then, when the counter 6 counts by L words, then a line feed signal is output. At the same time, the latch circuit 4 latches the value of the start address of the next line output from the multiplexer 3. The value latched by the latch circuit 4 is a value obtained by adding the address difference L+M between the lines to the value of the address $A_L$. However, since there is left only the address of L+M-α between the address $A_L$ and the final address $A_E$ of the ring buffer, the value of the latch circuit 4 exceeds the final address $A_E$ of the ring buffer.

As a result, regardless of the value of the counter 6, the output value of the adder 5 exceeds the final address $A_E$ of the ring buffer. Therefore, the comparator 16 outputs a switching signal to the multiplexer 20 and the output of the adder 15 is output to the terminal A. The value of the output is equal to a value obtained by adding the addresses L+M corresponding to 1 line to the address value of the address $A_{L-T}$. However, as described above, since the number of addresses between the addresses $A_{L-T}$ and $A_S$ is L+M-α, the value becomes just the start address $A_S$+α of the ring buffer, that is, it becomes the start address $A_T$ of the read-out target data.

On the other hand, the switching signal of the comparator 16 is applied to the multiplexer 9 as well, whereby the output $A_{L-T}$ of the subtractor 14 is applied to the adder 8, instead of the output of the latch circuit 4. In the adder 8, the output $A_{L-T}$ of the subtractor 14 and the value of the register 7, that is, the address difference L+M of the start addresses of two succeeding lines, are added together, and the value of such addition provides the start address $A_T$ of the read-out target data. The start address $A_T$ of the read-out target data is applied to the latch circuit 4 through the multiplexer 3, where it is latched.

Next, with the thus latched value as an initial value, the address value from the address generation circuit 1 is increased. When the transfer address shifts over the final address of the ring buffer and returns again back to the start part of the ring buffer, the initial value of the address generation circuit 1 is reset to thereby initialize the address generation circuit 1.

Figure 2:
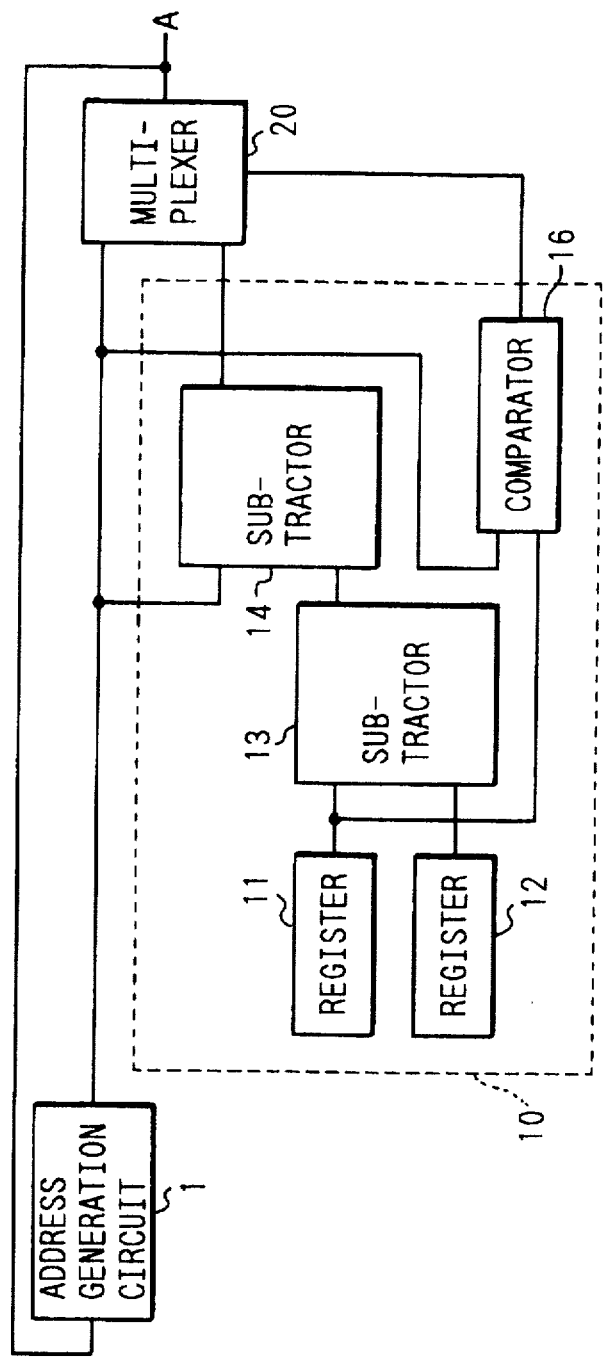
FIG. 2 is a block diagram showing a second embodiment of a DMA control device according to the present invention.

FIG. 2 is a block diagram showing a second embodiment of a DMA control device according to the present invention. In FIG. 2, reference characters respectively correspond to those shown in FIG. 1. Since an address generation circuit 1 shown in FIG. 2 is basically the same as that shown in FIG. 1, the detailed description thereof is omitted in the second embodiment.

The output of a subtractor 13 is the same as the output of the subtractor 13 shown in FIG. 1 and represents the total address number of the ring buffer. In the first embodiment shown in FIG. 1, although the subtractor 14 subtracts the output value (total address number) of the subtractor 13 from the start address of each of the lines, in the second embodiment, the output value of the subtractor 13 is subtracted from the value of an address currently generated. However, the operation indicates only the fact that an order of adding the value of the counter 6 to the start address of each of the lines is replaced by an order of subtracting the output (total address number) of the subtractor 13 from the start address of each of the lines. Therefore in the long run, the same value is input to the multiplexer 20. That is, the second embodiment can provide a similar effect to the first embodiment.

According to the second embodiment, it is possible to reduce the number of adders by an adder in comparison with the first embodiment.

As is described above, according to the DMA control device of the invention, there can be provided the following effects.

When the address value from the address generation circuit exceeds the value of the final address of the ring buffer, the address generation circuit can be initialized by means of a value obtained by subtracting the total address number of the ring buffer from the address value. As a result, in the case of reading out the data that are written in the ring buffer, even if the address value from the address generation circuit is output so as to shift over the final address of the ring buffer, the read-out position always returns to the start address of the read-out target data so that the data can always be read out accurately.

What is claimed is:

1. A DMA control device for generating address signals to a ring buffer during an image data transfer, comprising:

an address generation means for generating said address signals to said ring buffer sequentially by: providing a start address equal to an address within a range of said ring buffer, incrementing said start address according to the output of a counter, clearing said counter and generating a line feed signal when said counter reaches a set value, and generating a subsequent start address, discontinuous with said incremented start address, of next data to be read out each time that said line feed signal is generated, wherein the subsequent start address is generated by adding the line length of a line in the image data to the provided start address; and a corrected address generation means for initializing said address generation means to a value obtained by substracting the total number of addresses of said ring buffer from said address generated from said address generation means when said address exceeds a final address of said ring buffer.

2. The DMA control device as set forth in claim 1, wherein said corrected address generation means includes a first register for holding said final address of said ring buffer, a second register for holding 9 starting address of said ring buffer, a first subtractor for outputting a difference between a value of said first register and a value of said second register, and a circuit for outputting a value obtained by subtracting an output of said first subtractor from an output of said address generation means.

3. The DMA control device as set forth in claim 2, wherein said corrected address generation means further includes a comparator for comparing an output of said address generation means with the value of said first register.

4. The DMA control device as set forth in claim 1, wherein said circuit of said address generation means includes a third register for holding an initial start address a fourth register for holding the line length, which is equal to a difference value between two succeeding lines in an image data, a first adder for outputting a start address of a next line to be read out in said image data by adding a start address of a previous line to a value of said forth register, a first multiplexer for switching between outputs of said third register and first adder, a latch circuit for latching an output of said first multiplexer, and a second adder for adding a value of said counter to an output of said latch circuit.

5. The DMA control device as set forth in claim 4, wherein said corrected address generation means includes a first register for holding said final address of said ring buffer, a second register for holding said start address of said ring buffer, a first subtractor for outputting a difference between a value of said first register and a value of said second register, and a second subtractor for subtracting an output of said first subtractor from the output of said latch circuit, and a third adder for outputting a value obtained by adding the value of said counter to an output of said second subtractor.

6. The DMA control device as set forth in claim 5, wherein said corrected address generation means further includes a comparator for comparing an output from said second adder with the value of said first register.

7. The DMA control device as set forth in claim 6, wherein said address generation means further includes a second multiplexer for outputting to said first adder an output switched between the output of said latch circuit and an output of second subtractor.

8. The DMA control device as set forth in claim 7, further comprising third multiplexer for generating an output signal switched between an output of said address generation means and an output of said corrected address generation means by a switching signal output from said comparator.

* * * * *

UNITED STATES PATENT AND TRADEMARK OFFICE
CERTIFICATE OF CORRECTION

PATENT NO. : 5,787,497
DATED : July 28, 1998
INVENTOR(S) : Hitoshi TOKURA et al.

It is certified that error appears in the above-indentified patent and that said Letters Patent is hereby corrected as shown below:

Claim 1, Col. 8, lines 6-7, "substracting" should read --subtracting--.

Claim 2, Col. 8, line 14, "9" should read --a--.

Claim 4, Col. 8, line 26, after "address", insert --,--.

Claim 4, Col. 8, line 31, "forth" should read --fourth--.

Signed and Sealed this

Nineteenth Day of October, 1999

Attest:

Attesting Officer

Q. TODD DICKINSON

Acting Commissioner of Patents and Trademarks